United States Patent
Jikeya (10) Patent No.: US 8,930,854 B2
(45) Date of Patent: Jan. 6, 2015

(54) DISPLAY METHOD AND INFORMATION PROCESSING APPARATUS

(75) Inventor: Mitsuru Jikeya, Tokyo (JP)

(73) Assignee: Sony Corporation, Tokyo (JP)

( * ) Notice: Subject to any disclaimer, the term of this patent is extended or adjusted under 35 U.S.C. 154(b) by 892 days.

(21) Appl. No.: 13/115,386

(22) Filed: May 25, 2011

(65) Prior Publication Data

US 2011/0296328 A1    Dec. 1, 2011

(30) Foreign Application Priority Data

Jun. 1, 2010 (JP) ................................. 2010-125613

(51) Int. Cl.
G06F 3/033 (2013.01)
G06F 3/048 (2013.01)
G06F 17/30 (2006.01)
G06F 3/0481 (2013.01)
G06F 3/0482 (2013.01)
G06F 3/0486 (2013.01)

(52) U.S. Cl.
CPC ........ G06F 17/3007 (2013.01); G06F 3/04817 (2013.01); G06F 3/0482 (2013.01); G06F 3/0486 (2013.01)
USPC ............ 715/863; 715/764; 715/769; 715/837

(58) Field of Classification Search
CPC . G06F 3/04817; G06F 3/0481; G06F 3/0488; G06F 17/30126; G06F 3/04845; G06F 17/30115; G06F 3/017
USPC .................. 715/775, 863, 837, 769
See application file for complete search history.

(56) References Cited

U.S. PATENT DOCUMENTS

| | | | |
|---|---|---|---|
| 5,442,795 A * | 8/1995 | Levine et al. ................. | 715/775 |
| 5,678,014 A * | 10/1997 | Malamud et al. ............. | 715/835 |
| 8,402,382 B2 * | 3/2013 | Agarawala et al. ........... | 715/765 |
| 2006/0007182 A1* | 1/2006 | Sato et al. .................... | 345/173 |
| 2006/0136833 A1* | 6/2006 | Dettinger et al. ............. | 715/769 |
| 2011/0055773 A1* | 3/2011 | Agarawala et al. ........... | 715/863 |
| 2011/0145282 A1* | 6/2011 | Moore et al. ................. | 707/769 |

OTHER PUBLICATIONS

Agarawala et al., Keepin' It Real: Pushing the Desktop Metaphor with Physics, Piles and the Pen, Apr. 2006, ACM.*
Mander et al., A 'Pile' Metaphor for Supporting Casual Organization of Information, May 1992, ACM.*

* cited by examiner

*Primary Examiner* — Nicholas Ulrich
(74) *Attorney, Agent, or Firm* — Wolf, Greenfield & Sacks, P.C.

(57) ABSTRACT

A display method executed by an information processing apparatus having an operating section, a display section, and a control section exercising display control over the display section, wherein a folder having a plurality of objects stored therein includes: displaying a folder icon representing the folder on the display section; and displaying a locus associated with a dragging operation performed on the folder icon using the operating section under control exercised by the control section and deploying and displaying object icons representing the objects on the locus.

9 Claims, 10 Drawing Sheets

FAST DRAGGING OPERATION

FAST DRAGGING OPERATION

FIG.6B

SLOW DRAGGING OPERATION

DISPLAY METHOD AND INFORMATION PROCESSING APPARATUS

TECHNICAL FIELD

The present disclosure relates to a display method which allows the content of a folder to be checked without opening a browsing window and relates to an information processing apparatus employing such a method.

BACKGROUND

Recently, there is a trend toward personal computers having greater display screens. A user of a personal computer normally have a plurality of rectangular individual screens called windows displayed on the display screen, and the user can efficiently carry out his or her tasks using the plurality of windows kept open on the screen. In order to organize pieces of data stored in a personal computer, a user may create a collection of files, which is called a folder, to manage files of the same type collectively.

As a result of increase in the capacity of storage devices, it has become possible to store an enormous amount of data in a personal computer. Under such circumstances, a user of a computer is sometimes unable to remember what kinds of files have been stored and in which folders. Then, a user may use a file browsing function such as Explorer of Windows (registered trademark) or Finder of MaCintosh to check the content of folders. Alternatively, a tree structure may be displayed to allow a user to check data stored in a personal computer as disclosed in JP-A-2007-26210 (Patent Document 1).

SUMMARY

When a file browsing function or a tree structure is used or displayed, a browsing window is displayed on the display screen of a computer, and the browsing window may overlap another window on the screen. As a result, the work area on the display screen is narrowed, which reduces work efficiency. In the case of mobile terminals prevailing recently, a process of opening a file browsing window takes time, which is problematic in that the efficiency of work and operations is reduced.

Thus, it is therefore desirable to provide a display method which allows the content of a folder to be checked without opening a file browsing window and to provide an information processing apparatus utilizing such a method.

According to an embodiment of the present disclosure, there is provided a display method executed by an information processing apparatus having an operating section, a display section, and a control section exercising display control over the display section, wherein a folder having a plurality of objects stored therein. The method includes the steps of displaying a folder icon representing the folder on the display section and displaying a locus associated with a dragging operation performed on the folder icon using the operating section under control exercised by the control section and deploying and displaying object icons representing the objects on the locus.

According to another embodiment of the present disclosure, there is provided a display method executed by an information processing apparatus having an operating section, a display section, and a control section exercising display control over the display section, wherein a first folder having a plurality of objects including at least a second folder stored therein and the second folder having a plurality of objects stored therein. The method includes the steps of displaying a first folder icon representing the first folder on the display section, displaying a first locus associated with a first dragging operation performed on the first folder icon using the operating section under control exercised by the control section, deploying and displaying object icons for objects stored in the first folder on the first locus and deploying and displaying a second folder icon representing at least the second folder, displaying a second locus associated with a second dragging operation performed on the second folder icon using the operating section in a direction different from the direction of the first dragging operation, and deploying and displaying object icons for the objects stored in the second folder on the second locus.

According to still another embodiment of the present disclosure, there is provided an information processing apparatus including an operating section, a display section, and a control section exercising display control over the display section. A plurality of objects are stored in a folder. A folder icon representing the folder is displayed on the display section. A locus associated with a dragging operation performed on the folder icon using the operating section under control exercised by the control section is displayed, and object icons representing the objects are deployed and displayed on the locus.

According to the embodiments of the present disclosure, the content of a folder can be quickly checked. More specifically, the content of a folder can be checked without opening a file browsing window. Therefore, a display screen can be effectively used, and high operational efficiency can be achieved.

DETAILED DESCRIPTION

Figure 1:
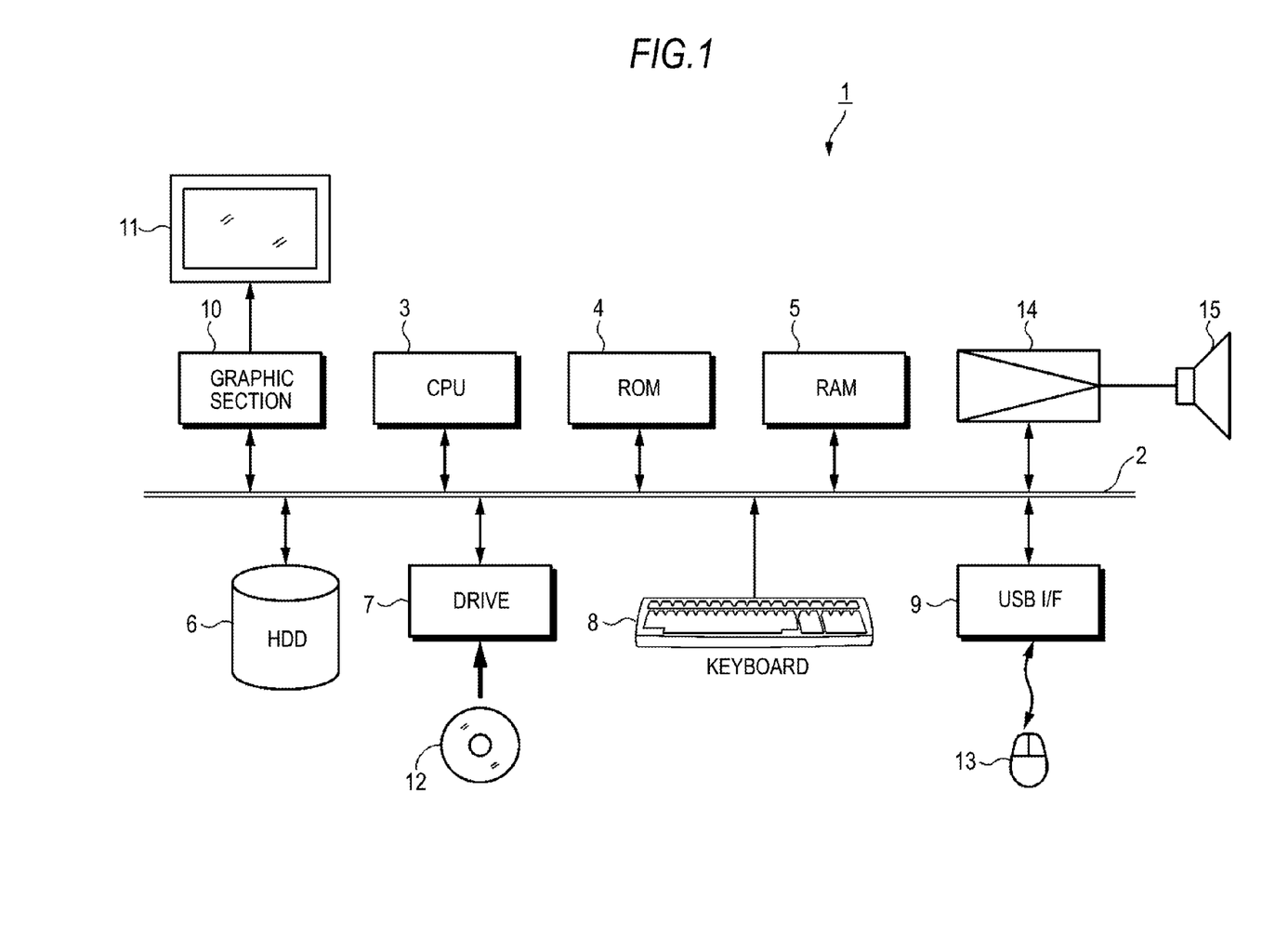
FIG. 1 is a block diagram showing a configuration of an information processing apparatus according to an embodiment of the present disclosure.

Embodiments of the present disclosure will now be described with reference to the drawings. The following items will be described in the order listed.
<Embodiment>
1. Configuration of Information Processing Apparatus
2. Configuration of Mouse
3. Exemplary File System
4. Exemplary Display Operations during Browsing (First to Sixth Exemplary Display Operations)
5. Exemplary Display Operations during Erasure
6. Flow of Processes
7. Application
8. Modifications (Modifications 1 to 8)<
<Embodiment>
1. Configuration of Information Processing Apparatus FIG. 1 shows an exemplary configuration of an information processing apparatus according to an embodiment of the present disclosure. Although an exemplary information processing apparatus according to this embodiment will be described as a personal computer, the present disclosure is not limited to such apparatus. For example, the embodiment of the present disclosure is applicable to other types of information processing apparatus having a display section such as mobile terminals and mobile audio players.

A CPU (Central Processing Unit) 3, a ROM (Read Only Memory) 4, a RAM (Random Access Memory) 5, a hard disc drive (HDD) 6, a driver 7, a keyboard 8, a USB interface 9 for a mouse, a graphic section 10, and an amplifier 14 are connected to a bus 2 of a personal computer 1. The CPU 3 controls operations of various parts of the personal computer 1 according to programs stored in advance in the hard disc drive 6 and the ROM 4. For example, the RAM 5 is used as a work memory by the CPU 3 when the CPU executes a program.

The driver 7 reads out data recorded in a recording medium 12. For example, the recording medium 12 may be a DVD-ROM (Digital Versatile Disc-ROM). The data may be recorded by the driver 7 using a recordable recording medium 12 such as a DVD-R (Digital Versatile Disc-recordable) or a DVD-RW (Digital Versatile Disc-ReWritable).

The keyboard 8 outputs a signal according to a key operation performed by a user. The signal is supplied to the CPU 3, and the CPU 3 generates a display control signal according to the signal and supplies a display control signal thus generated to the graphic section 10. The graphic section 10 controls a display circuit and the like in a display section according to the display control signal to display characters or the like on the display section 11 according to the key operation.

The personal computer 1 is operated using a mouse 13 in addition to the keyboard 8. The mouse 13 is connected to the personal computer 1 through, for example, a USB (Universal Serial Bus).

A mouse operation signal resulting from an operation of the mouse 13 is received at the USB interface 9. The mouse operation signal is supplied from the USB interface 9 to the CPU 3 through the bus 2. According to the mouse operation signal supplied, the CPU 3 generates a display control signal for displaying a mouse pointer or a display control signal for executing display control as described later. Such a display control signal is supplied to the graphic section 10. According to the display control signal, the graphic section 10 controls the display circuit and the like in the display section 11 to display an image or the like according to the operation of the mouse 13.

For example, when an operation of selecting a folder is performed using the mouse 13, the CPU 3 recognizes that the folder has been selected from a mouse operation signal supplied from the mouse 13. When the mouse 13 is moved, the CPU 3 recognizes a coordinate on the screen of the display section 11 based on a moving amount, a moving direction, and a moving speed obtained from a mouse operation signal and generates a display control signal for moving the mouse pointer to the coordinate at a predetermined speed. The display control signal is supplied from the CPU 3 to the graphic section 10, and the graphic section 10 performs a process based on the display control signal to move the mouse pointer on the screen of the display section 11.

The display section 11 is, for example, an LCD (Liquid Crystal Display) or an organic EL (Electronic Luminescence) display. A user causes the display section 11 to display windows for executing various applications and operations such as edition of a document, reproduction of music, and reproduction of a moving image are performed on at the display section 11. Frequently used folders and files are displayed on the display section 11 in the form of what are called shortcuts.

The personal computer 1 has a music reproducing function. For example, audio signals recorded in the HDD 6 or the recording medium 12 are read out under control exercised by the CPU 3. The audio signals read out are supplied to the amplifier 14 through the bus 2. The audio signals are amplified by the amplifier 14 and reproduced from a speaker 15. In addition to reproduction of music, the amplifier 14 and the speaker 15 may be used for reproducing an alarm sound for notifying the user of the occurrence of an erroneous operation.

2. Configuration of Mouse

Figure 2A:
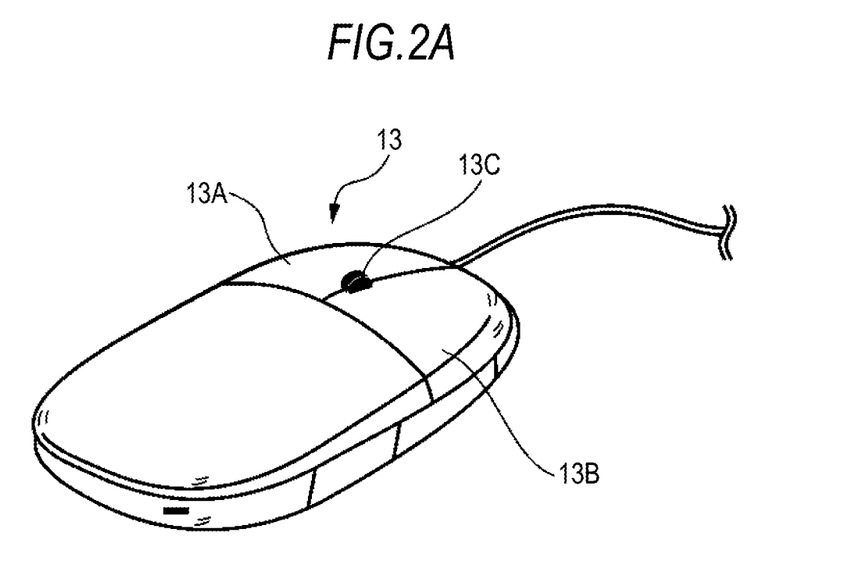
FIGS. 2A and 2B are illustrations showing a configuration of a mouse according to the embodiment of the present disclosure.
Figure 2B:
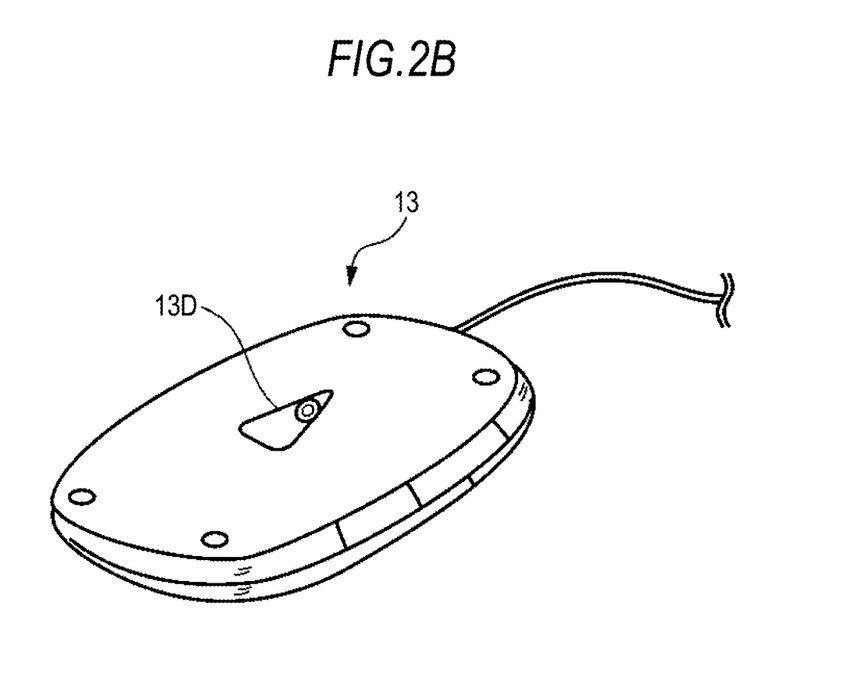

FIG. 2A is a perspective view of the mouse 13 of the present embodiment, and FIG. 2B is a perspective view of the mouse 13 taken from a bottom side thereof. As shown in FIG. 2A, the mouse 13 of the present embodiment includes a mouse button 13A, a mouse button 13B, and a wheel 13C. Alternatively, three or more mouse buttons may be provided, and the wheel 13C may be deleted.

As shown in FIG. 2B, a position sensor 13D is provided on the bottom of the mouse 13. For example, the position sensor 13D includes a light-emitting portion constituted by an LCD (Light Emitting Diode) and an optical sensor such as a photo diode. Light emitted by the light-emitting portion is received by the optical sensor after being reflected by something, and a moving amount is detected based on a change in the received light.

The personal computer 1 is operated using the mouse 13 having such a configuration. For example, a dragging operation is performed using the mouse 13. In the present specification, the term "dragging operation" means an operation of selecting a particular folder or file and moving operating means so as to draw an arbitrary locus on the display screen with the file or folder kept in the selected state. While the dragging operation is performed using the mouse 13 in this embodiment, the operation may be performed according to a method other than the use of the mouse.

3. Exemplary File System

Figure 3:
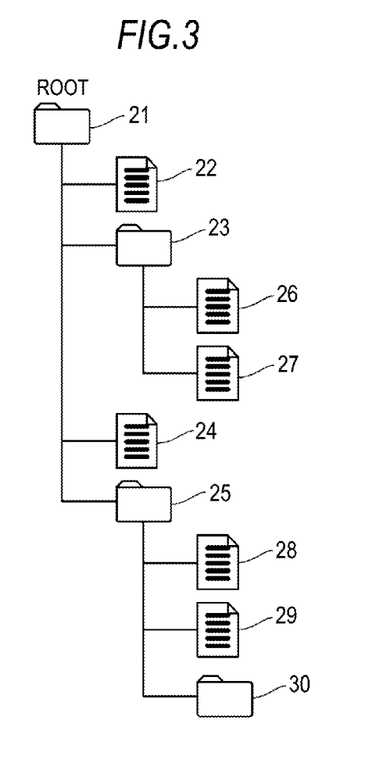
FIG. 3 is an illustration showing an exemplary file system according to the embodiment of the present disclosure.

FIG. 3 shows an exemplary file system of the personal computer 1 of the present embodiment. As shown in FIG. 3, the file system is constructed in a hierarchical structure in which a file 22, a file 24, a folder 23, and a folder 25 are stored in the layer just below a folder 21 at the highest level that is called a route directory. A file 26 and a file 27 are stored in the layer just below the folder 23. A file 28, a file 29, and a folder 30 are stored in the layer just below the folder 25. The folder 30 may alternatively be referred to as "sub-folder" in consideration to its relationship with the folder 25. For example, there are file types such as text files, audio files, and moving image files.

In the present specification, the term "stored" means that a file folder belongs to a particular folder. In the file system having a hierarchical structure as shown in FIG. 3, a file or folder is stored in the layer just below the layer of the particular folder. For example, in the example shown in FIG. 3, the files 26 and 27 are stored in the folder 23, and the files 28 and 29 and the sub-folder 30 are stored in the folder 25.

A plurality of objects are stored in a folder. The term "object" means a file and/or folder. In the example shown in FIG. 3, the plurality of objects stored in the folder 23 are the files 26 and 27, and the plurality of objects stored in the folder 25 are the files 28 and 29 and the sub-folder 30.

An object which may be a folder or file is displayed on the display section 11 in the form of a visually perceivable pattern called an icon. Icons are displayed in the form of various patterns according to the content of respective objects or according to applications associated with the objects.

In the following description, an icon may be indicated by the same reference numeral as that indicating the folder or file represented by the icon, as occasion demands. For example, an icon representing the folder 25 may be referred to as "folder icon 25", and an icon representing the file 28 may be referred to as "file icon 28".

4. Exemplary Display Operations During Browsing

A description will now be made on exemplary display operations performed when objects stored in a folder is browsed. Display control resulting in the following exemplary views is exercised by the CPU 3.

Figures 4A, 4B:
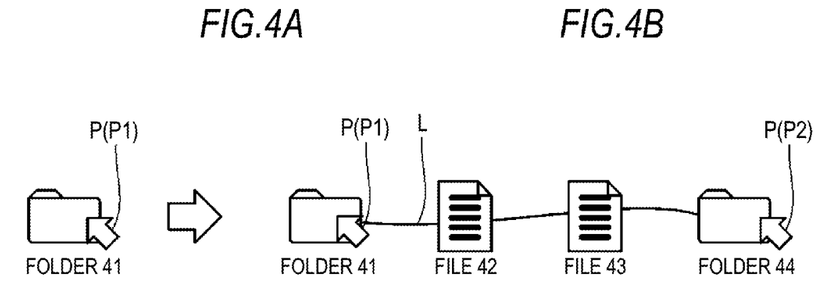
FIGS. 4A and 4B are illustrations showing a first exemplary display operation according to the embodiment of the present disclosure.

A first exemplary display operation will now be described. As shown in FIG. 4A, a folder icon 41 is displayed on the display section 11. For example, the folder icon 41 is displayed on the display section 11 as a short-cut. It is not essential that a folder associated with the folder icon 41 is a route directory on the file system. A file 42, a file 43, and a folder 44 are stored in the folder 41 as examples of a plurality of objects as described above.

A user operates the mouse 13 with the folder icon 41 displayed. As a result of the operation on the mouse 13, a mouse pointer P is moved to a position P1 where the pointer overlaps the folder icon 41. The mouse button 13A is pressed with the mouse pointer P displayed in the position P1 to select the folder icon 41. At this time, the user may be notified that the folder icon 41 has been selected by changing the color of the folder icon 41. The CPU 3 recognizes that the folder icon 41 has been selected from a mouse operation signal supplied from the mouse 13. The CPU 3 also recognizes that the plurality of objects (the files 42 and 43 and the folder 44) stored in the folder 41 on the file system.

A dragging operation is then performed. For example, the mouse 13 is moved to the right with the mouse button 13A kept depressed. At this time, according to a mouse operation signal supplied from the mouse 13, the CPU 3 exercises display control for moving the mouse pointer P to the right and display control for displaying a locus resulting from the movement of the mouse pointer P.

Under the display control exercised by the CPU 3, a locus L resulting from the dragging operation is displayed. The CPU exercises control for deploying and displaying icons representing the objects stored in the folder 41 on the locus L. Specifically, the CPU 3 exercises control for displaying the locus L, generating icons for the objects stored in the folder 41 at respective predetermined timings, and displaying the icons thus generated on the locus L sequentially.

FIG. 4B shows an exemplary view of the screen taken when a dragging operation has been performed to move the mouse pointer P from the position P1 to a position P2. As the mouse pointer P moves to the right in response to the dragging operation, the locus L is displayed. As the locus L is displayed, icons for the plurality of objects are displayed on the locus L at respective predetermined timings. In this example, since the files 42 and 43 and the folder 44 are stored in the folder 41, a file icon 42, a file icon 43, and a folder icon 44 are sequentially displayed on the locus L.

The icons may be deployed and displayed at random, and they may alternatively be displayed in an order set by the user. In the present embodiment, for example, the order of display is set such that the icons are deployed and displayed in the order of their access counts. Therefore, the file icon 42 representing the file 42 whose access count is the greatest is displayed first. Then, the file icon 43 representing the file 43 whose access count is the second greatest is displayed. The folder icon 44 representing the folder 44 whose access count is the smallest is displayed at last.

As thus described, the content of a plurality of objects stored in a folder can be checked without opening a window for browsing.

Figure 5:
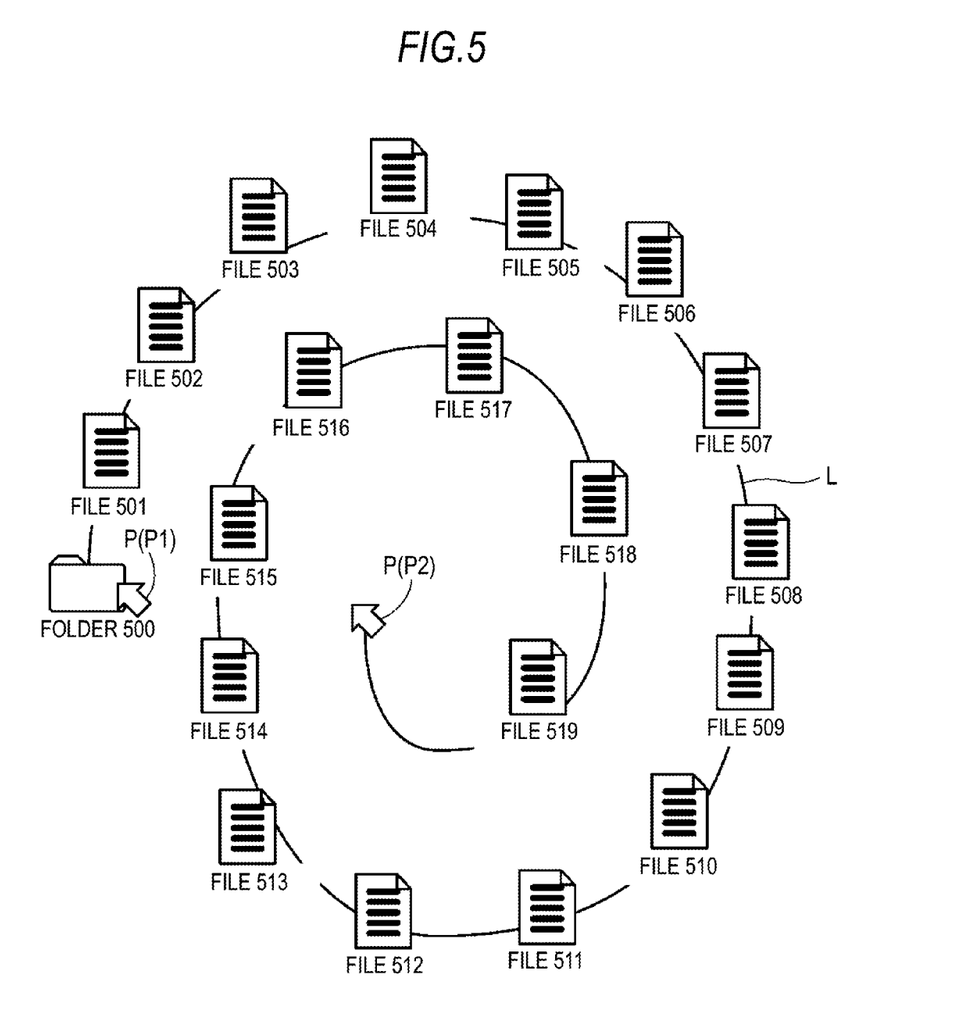
FIG. 5 is an illustration showing a second exemplary display operation according to the embodiment of the present disclosure.

A second exemplary display operation will now be described. As shown in FIG. 5, a folder icon 500 is displayed on the display section 11. Files 501 to 519 are stored in the folder associated with the folder icon 500 as examples of the plurality of objects as described above. The mouse 13 is operated such that the mouse pointer P overlaps the file icon 500. The mouse pointer P is moved to a position P1, and the mouse button 13A is pressed with the mouse pointer overlapping the folder icon 500. At this time, the CPU 3 recognizes that the folder icon 500 has been selected and recognizes the plurality of objects (the files 501 to 519) stored in the folder 500.

A dragging operation is performed by moving the mouse 13 such that the mouse pointer P is moved from the position P1 to a position P2 with the mouse button 13A kept depressed. The dragging operation is performed by moving the mouse 13 spirally. According to a mouse operation signal from the mouse 13, the CPU exercises control for displaying a spiral locus L on the display section 11. Icons for the plurality of objects stored in the folder 500 are generated at respective predetermined timings while the locus L is displayed, and the generated icons are sequentially displayed on the locus L. That is, file icons 501 to 519 are deployed and displayed on the locus L.

Since the dragging operation can be performed in any direction as thus described, the icons for the objects stored in the folder can be deployed and displayed along a locus extended in an arbitrary direction. Therefore, even when another window is open to be worked on the display section 11, the dragging operation can be performed so as to avoid such a window. Thus, the content of the folder can be checked while checking the widow to be worked.

When all of the icons for the objects stored in the folder 500 are deployed and displayed, the user may be notified of the fact. For example, when all of the icons for the objects have been deployed and displayed, the color of the mouse pointer P located at the end of the locus L (the position P2) may be changed. Thus, the user can recognize that all of the icons for the objects stored in the folder 500 are displayed, and the user can be prevented from performing the dragging operation longer than required.

Figure 6A:
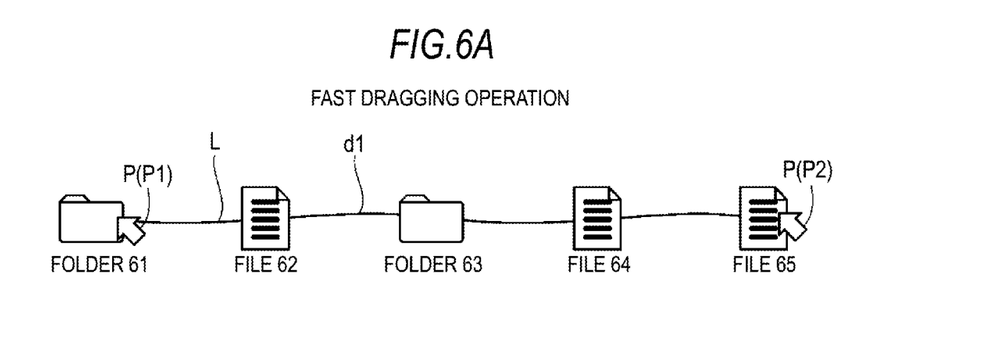
FIGS. 6A, 6B, and 6C are illustrations showing a third exemplary display operation according to the embodiment of the present disclosure.

A third exemplary display operation will now be described. FIG. 6A shows an exemplary view of the screen taken when a dragging operation is performed at a high speed. A dragging operation toward a folder icon 61 is performed at a high speed to move the mouse pointer from a position P1 to a position P2. A locus L is displayed as a result of the dragging operation, and icons for a plurality of objects stored in a folder 61 are displayed on the locus L. In this example, a file 62, a folder 63, a file 64, and a file 65 are stored in the folder 61 as an example of the plurality of objects described above. Therefore, a file icon 62, a folder icon 63, a file icon 64, and a file icon 65 are deployed and displayed.

Although the dragging operation is performed at a high speed to display the locus L, the CPU 3 displays each icon on the locus L at constant timing. Therefore, the icons deployed and displayed are spaced by a great distance d1 from each other.

Figure 6B:
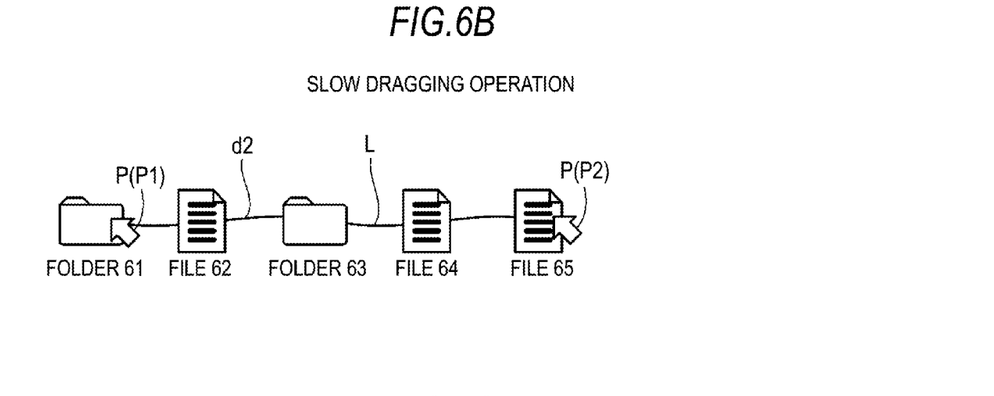
Figure 6C:
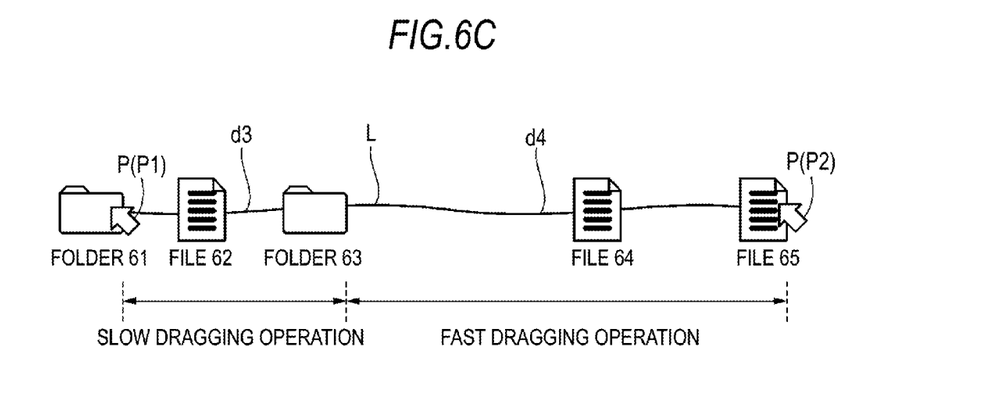

When the dragging operation is performed at a low speed, the locus L is gradually displayed. Since the CPU 3 displays each icon on the locus L at constant timing, the icons deployed and displayed are spaced from each other by a distance d2 which is smaller than the distance d1 between the icons displayed by the dragging operation at a high speed, as shown in FIG. 6B. When the dragging operation starts at a low speed and the speed of the dragging operation is increased after the folder icon 63 is displayed as shown in FIG. 6C, a distance d3 between icons displayed when the dragging operation is performed at a low speed is smaller than a distance d4 between icons displayed when the dragging operation is performed at a high speed. As thus described, the distance between the icons deployed and displayed varies depending on the speed of the dragging operation.

Figure 7:
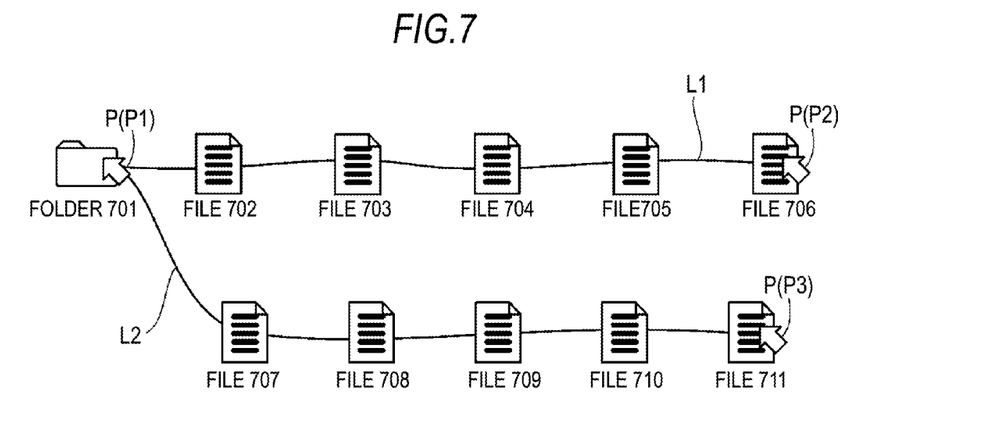
FIG. 7 is an illustration showing a fourth exemplary display operation according to the embodiment of the present disclosure.

A fourth exemplary display operation will now be described. As shown in FIG. 7, a folder icon 701 is displayed on the display section 11. Files 701 to 711 are stored in a folder 701 associated with the folder icon 701 as an example of the plurality of objects described above. A dragging operation is performed toward the folder icon 701. The mouse pointer P moves from a position P1 to a position P2 as a result of the dragging operation. A locus L1 is displayed as the dragging operation proceeds, and icons associated with the plurality of objects stored in the folder 701 are deployed and displayed on the locus L1.

The dragging operation is terminated when the mouse pointer P has moved to the position P2 and the file 706 has been deployed and displayed. The termination of a dragging operation means that the operation of selecting folders kept by the dragging operation is canceled. In this embodiment, the termination of a dragging operation is to cancel the operation of pressing the mouse button 13A which has been continued during the dragging operation.

When the dragging operation is stopped, it is determined by the CPU 3 whether icons to be deployed and displayed from the folder icon 701 still exist or not. In this example, since the file icons 702 to 706 have been deployed and displayed, file icons representing the files 707 to 711 stored in the folder 701 have not been deployed and displayed yet. Therefore, the CPU 3 recognizes that file icons to be deployed and displayed from the folder icon 701 still exist.

The CPU 3 exercises control for notifying that there are file icons which have not been deployed and displayed yet. For example, the CPU exercises control such that the color of the mouse pointer P or the folder icon 701 will be changed. Alternatively, such a notice may be provided by displaying a character near the folder icon 701 or the mouse pointer P. The notification may alternatively be carried out using a sound.

Thus, a user can recognize that not all of the icons representing the objects stored in the folder 701 have been deployed and displayed.

When the drag operation is performed on the folder icon 701 again after it is once terminated, the remaining file icons are deployed and displayed. At this time, if the drag operation is performed on the locus L1, the icons deployed and displayed will overlap the previous ones. Therefore, the second dragging operation is performed in a direction different from the direction of the first dragging operation. In this example, the second dragging operation moves the pointer P from the position P1 to a position P3. Specifically, the mouse pointer P is moved to the position P1 where the pointer overlaps the folder icon 701. The mouse pointer 13A is pressed when the mouse is in the position P1 to select the folder icon 701. The dragging operation is performed with the folder icon 701 kept in the selected state, and the mouse 13 is operated to move the mouse pointer P from the position P1 to the position P3.

A locus L2 is displayed as a result of the second dragging operation, and the file icons 707 to 711 which have not been deployed and displayed yet are deployed and displayed on the locus L2. As thus described, when a dragging operation is performed again on a file folder after the dragging operation on the same folder has been once terminated, the second dragging operation deploys and displays icons which have not been deployed and displayed yet only.

Figure 8:
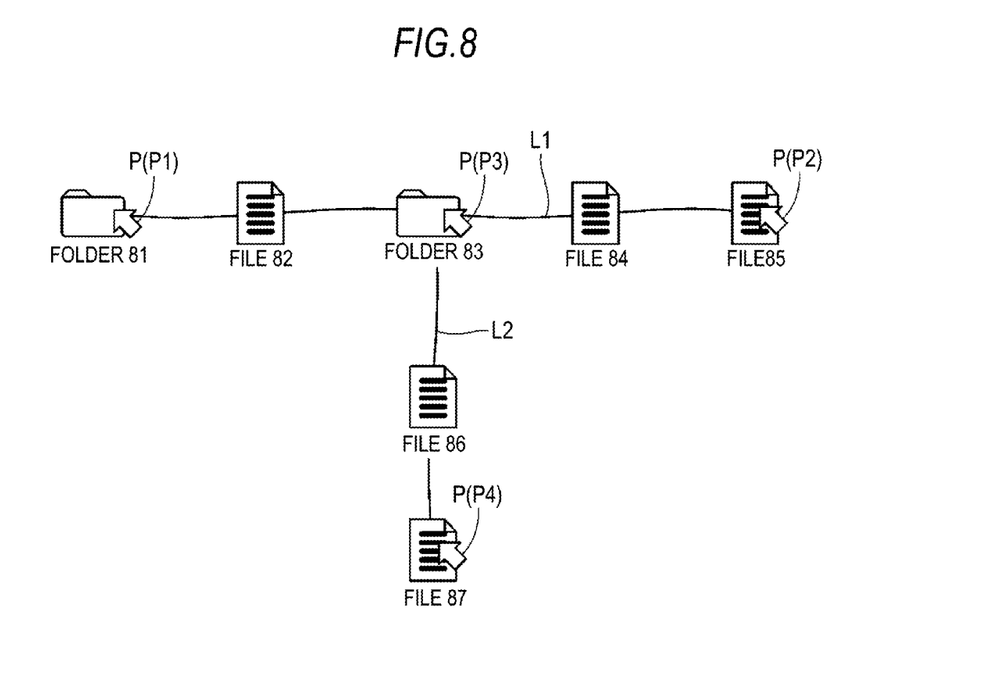
FIG. 8 is an illustration showing a fifth exemplary display operation according to the embodiment of the present disclosure.

A fifth exemplary display operation will now be described. As shown in FIG. 8, a folder icon 81 is displayed on the display section 11 as a first folder icon. At least a folder 83 as a second folder is stored in a folder 81 as a first folder associated with the folder icon 81. In this example, files 82, 84, and 85 are stored in the folder 81.

A first dragging operation is performed on the folder icon 81. That is, the mouse pointer P is moved to a position P1 in which the pointer overlaps the folder icon 81. Then, the mouse button 13A is pressed to select the folder icon 81. The mouse 13 is operated to move the mouse pointer P from the position P1 to a position P2 with the mouse button 13A kept depressed.

A locus L1 as a first locus is displayed as a result of the first dragging operation, and icons for the plurality of objects stored in the folder 81 are deployed and displayed on the locus L1. Specifically, folder icons 82, 83, 84, and 85 are deployed and displayed on the locus L1 as a result of the first dragging operation.

The first dragging operation is terminated at the position P2, and the deployment and display of the folder icon 81 is finished. Next, a second dragging operation is performed on the folder icon 83. The second dragging operation is performed in a direction different from the direction of the first dragging operation such that icons deployed and displayed by the operation will not overlap the existing icons.

The mouse pointer P is moved to a position P3 in which the pointer overlaps the folder icon 83. Then, the mouse button 13A is pressed to select the folder icon 83. The mouse pointer P is moved from the position P3 to a position P4 with the folder icon kept selected. The second dragging operation is performed as thus described. A locus L2 as a second locus is displayed as a result of the second dragging operation, and icons for objects stored in a folder 83 are deployed and displayed on the locus L2. In this example, since files 86 and 87 are stored in the folder 83, file icons 86 and 87 are deployed and displayed.

As thus described, the content of a sub-folder in the layer below a certain folder can be checked without opening a window. It is not essential that the icons for all objects are deployed and displayed as a result of the first dragging operation. The first dragging operation may be terminated when the folder icon 83 is displayed, and the second dragging operation on the folder icon 83 may be thereafter performed.

Figure 9A:
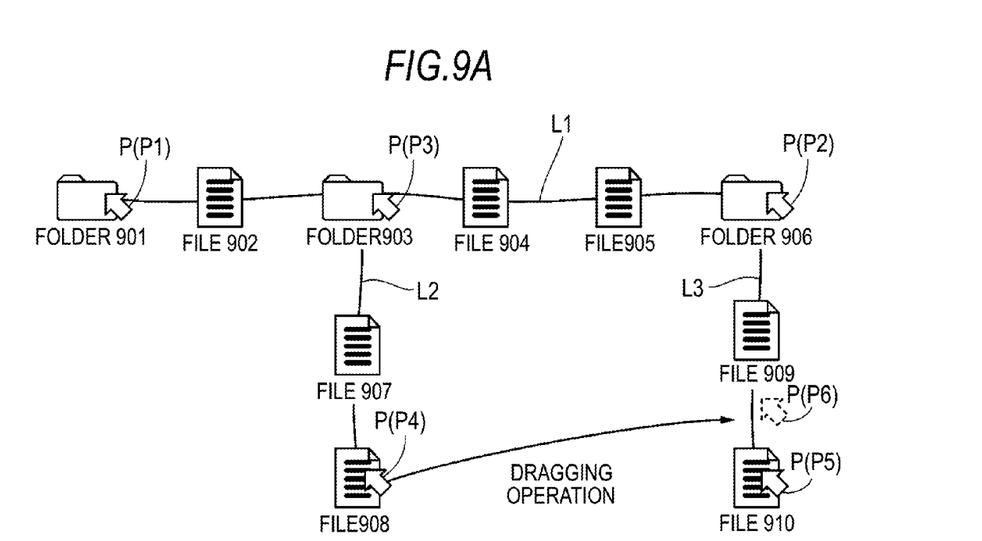
FIGS. 9A and 9B are illustrations showing a sixth exemplary display operation according to the embodiment of the present disclosure.

Next, a sixth exemplary display operation will be described. As shown in FIG. 9A, a folder icon 901 as a first folder icon is displayed. At least a folder 903 as a second folder and a folder 906 as a third folder are stored in a folder 901 associated with the folder icon 901. In this example, files 902, 904, and 905 are further stored in the folder 901. Files 907 and 908 are stored in the folder 903, and files 909 and 910 are stored in the folder 906.

A first dragging operation is performed on the folder icon 901. A locus L1 is displayed as the mouse pointer P is moved from a position P1 to a position P2 as a result of the first dragging operation. Icons for the plurality of objects stored in the folder 901 are deployed and displayed on the locus L1. In this example, a file icon 902, a folder icon 903 as a second folder icon, file icons 904 and 905, and a folder icon 906 as a third folder icon are displayed on the locus L1.

The first dragging operation is terminated at the position P2. Then, a second dragging operation is performed on the folder icon 903. Specifically, the folder icon 903 is selected by moving the mouse pointer P to a position P3, and a second dragging operation is performed such that the mouse pointer P is moved to a position P4 with the folder icon 903 kept selected. A locus L2, which is a second locus, is displayed as a result of the second dragging operation, and icons for the objects stored in the folder 903 are deployed and displayed on the locus L2. In this example, file icons 907 and 908 are deployed and displayed on the locus L2. The operation is similar to the above-described operation of the fifth example up to this stage.

In this example, a third dragging operation is further performed on the folder icon 906. After the second dragging operation is terminated, the mouse pointer P is moved to a position P2. The mouse button 13A is pressed in this state to select the folder icon 906. The third dragging operation is performed such that the mouse pointer P is moved from the position P2 to a position P5 with the folder icon 906 kept selected. Then, a locus L3 as a third locus is displayed, and icons for the plurality of objects stored in the folder 906 are deployed and displayed on the locus L3. In this example, file icons 909 and 910 are deployed and displayed.

After the third dragging operation is terminated, the mouse pointer P is moved to a position P4 in which the pointer overlaps the file icon 908, and the mouse button 13A is pressed to select the file icon 908. A dragging operation is performed by moving the mouse pointer P from the position P4 to a position P6 with the folder icon kept selected. The dragging operation on the file icon at this time is carried out in a manner different from a dragging operation on a folder icon.

Figure 9B:
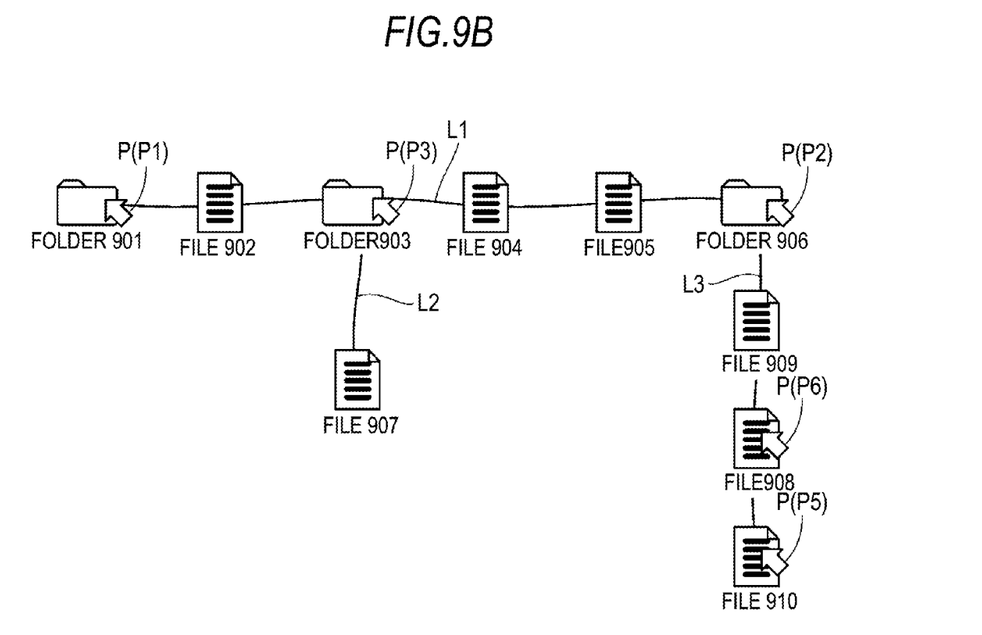

As a result of the dragging operation, the file icon displayed on the locus L2 is moved onto the locus L3. As shown in FIG. 9B, the file icon 908 disappears from the locus L2, and the icon is displayed on the locus L3. When the CPU 3 recognizes that the file icon 908 has been moved onto the locus L3 as thus described, the CPU 3 changes the configuration of the file system. In this example, a file associated with a file icon displayed on the locus L3 is a file to be stored in the folder 906. Therefore, the file system is updated such that the file 908 associated with the file icon 908 will be stored in the folder 906. As thus described, each icon deployed and displayed can be freely moved to change a hierarchical relationship between folders and files.

5. Exemplary Display Operations During Erasure

A description will now be made on an exemplary view of erasure of a plurality of icons which have been deployed and displayed. Display control for closing a file is also exercised by the CPU 3.

Figures 10A, 10B:
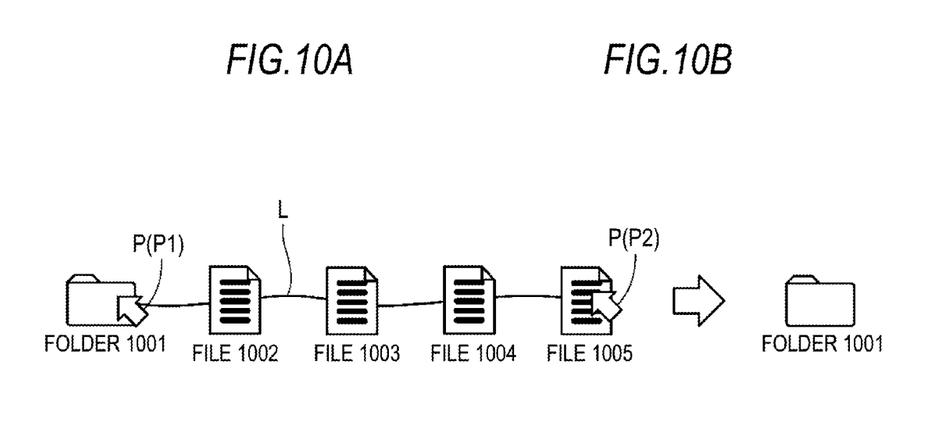
FIGS. 10A and 10B are illustrations showing an exemplary view of an erasing operation according to the embodiment of the present disclosure.

As shown in FIG. 10A, the mouse pointer P is moved to a position P1, and the mouse button 13A is pressed to select a folder icon 1001. A dragging operation is performed by moving the mouse pointer P from the position P1 to a position P2 with the mouse button 13A kept depressed. As a result of the dragging operation, a locus L is displayed, and objects stored in a folder 1001 are deployed and displayed on the locus L. Then, the dragging operation is stopped. In this example, since files 1002, 1003, 1004, and 1005 are stored in the folder 1001, file icons 1002 to 1005 are deployed and displayed.

After the content of the folder 1001 is checked by a user, a predetermined operation is performed to erase the file icons 1002 to 1005 deployed and displayed. For example, the predetermined operation may be an operation of moving the mouse pointer P to a position P1 in which the pointer overlaps the folder icon 1001 and double-clicking the mouse button 13A.

In response, the CPU 3 exercises control to erase the file icons 1002 to 1005. For example, the dragging operation performed on the folder icon 1001 may be stored, and the coordinates of the deployed and displayed files 1002 to 1005 on the display section 11 may be stored in advance. When the user double-clicks on the folder icon 1001, the CPU recognizes that the erasure of the icon is instructed by the user. When the erasure instruction is recognized, the CPU 3 exercises control to erase the icons 1002 to 1005 located at the coordinates on the display section 11 stored in advance.

Under the erasure control exercised by the CPU 3, for example, the icons on the locus L are sequentially erased at predetermined timing starting with the file icon 1005 at the end of the locus. The file icon 1005 and a part of the locus in the vicinity thereof are first erased, and the file icon 1004 and a part of the locus in the vicinity thereof are erased at the next timing. Such a process is thereafter repeated.

The file icon 1002 and a part of the locus in the vicinity thereof are finally erased, and only the folder icon 1001 remains displayed as shown in FIG. 10B. As thus described, the icons are sequentially erased starting with the file icon 1005 at the end of the locus L, followed by the file icon 1004, the file icon 1003, and the file icon 1002. Thus, the file icons 1002 to 1005 are erased from the display section 11 as if they were absorbed by the folder icon 1001.

The predetermined operation on the folder icon 1001 is not limited to double-clicking the mouse button 13B, and the operation may be performed in other appropriate manners.

6. Flow of Processes

Figure 11:
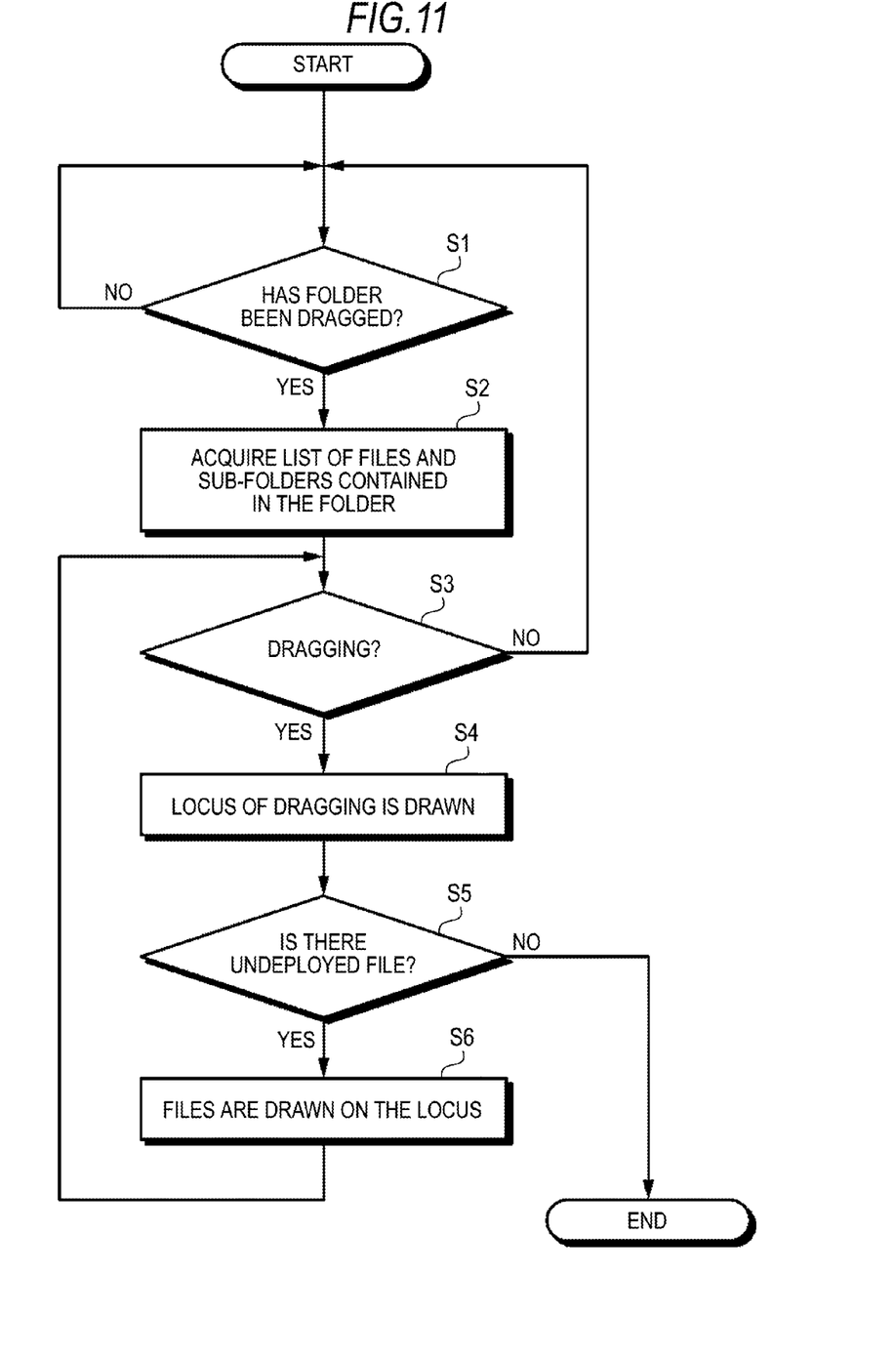
FIG. 11 is a flow chart showing a flow of processes performed in the first example according to the embodiment of the present disclosure.

FIG. 11 is a flow chart showing a flow of processes performed in the first example. The processes at steps S1 to S6 shown in FIG. 11 are executed under control exercised by the CPU 3.

At step S1, it is determined whether a dragging operation has been performed on a folder displayed on the screen. When no dragging operation has been performed, the process at step S1 is repeated. When a dragging operation has been performed, the flow proceeds to step S2.

At step S2, information on objects stored in the dragged folder is acquired. Information on the order of deployment and display of objects which has bee set in advance by a user is also acquired. Then, a dragging operation is started, and the flow proceeds to step S3.

At step S3, it is determined whether the dragging operation is in progress or not. When the dragging operation has been terminated, the flow returns to step S1 at which it is determined whether the dragging operation on the folder has been completed or not. When the dragging operation is in progress, the flow proceeds to step S4.

At step S4, a locus associated with the dragging operation is displayed. Then, the flow proceeds to step S5.

At step S5, it is determined whether the folder includes icon for objects which have not been deployed and displayed yet. When the folder includes icons for objects which have not been deployed and displayed yet, the flow proceeds to step S6.

At step S6, icons associated with a plurality of objects are generated, and the generated icons are sequentially displayed on the locus. At this time, the icons are displayed in the order of the acquisition at step S2 at predetermined timing. The flow then returns to step S3 at which it is determined again whether dragging is in progress or not.

When it is determined at step S5 that all of the icons for the objects stored in the folder have been deployed and displayed, the flow ends.

The flow chart shown in FIG. 11 shows a flow of processes executed in the first example. The process performed at each of the steps may be appropriately changed to accommodate each of the above-described examples. For example, in the case of the example described with reference to FIG. 7 in which object icons which have not been deployed and displayed are displayed using different dragging operations, the process at step S2 is changed to a process of acquiring information on a list of objects which have not bee deployed and displayed yet.

7. Application

Figure 12:
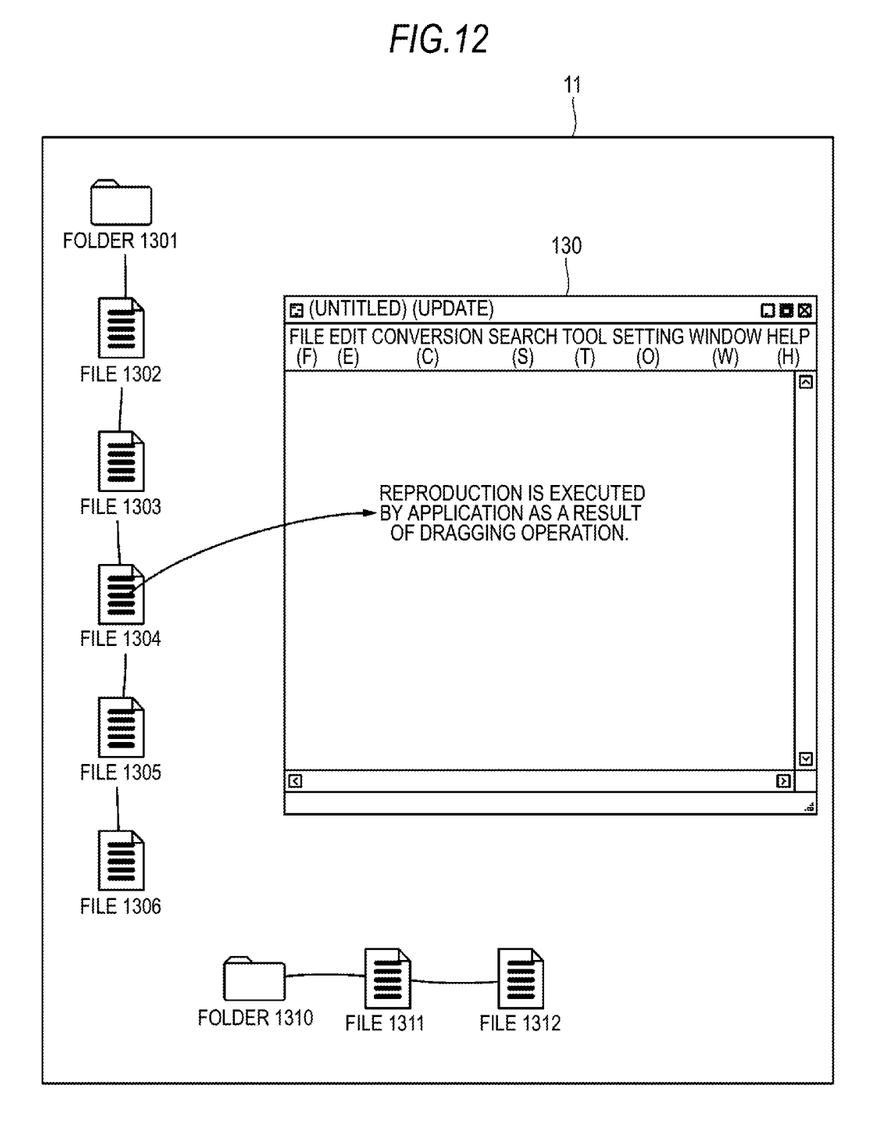
FIG. 12 is an illustration showing an application of the embodiment of the present disclosure.

An application of the present embodiment of the present disclosure will now be described. As shown in FIG. 12, a window 130 of an application is displayed on the display screen 11. The user can perform a dragging operation as described above to check the content of folders 1301 and 1310. In this example, files 1302, 1303, and 1306 are stored in the folder 1301, and files 1311 and 1312 are stored in the folder 1310.

For example, a dragging operation may be performed on the folder icon 1301 to deploy and display file icons 1302 to 1306. A dragging operation may be performed on the folder icon 1310 to deploy and display file icons 1311 and 1312. At this time, since the dragging operation can be performed in arbitrary directions, the icons can be deployed and displayed so as to avoid the window 130 as shown in FIG. 12.

The user may drag any of the icons deployed and displayed as thus described above (the file icon 1304 in this example) into the window 130 to execute the file 1304 on the application.

More specifically, let us assume that the window 130 is a window associated with an application for reproducing music and that the window shows a predetermined play list showing the titles of pieces of music contained in music files and the order in which the pieces of music are reproduced. Let us also assume that there is a function of allowing a user to drag a music file into the window 130 to add the dragged music file to the predetermined play list.

A user may attempt to add a music file stored in the folder 1301 or 1310 to the play list. At this time, an icon for the music file stored in the folder 1301 or 1310 can be deployed and displayed away from the window 130 to check the content of the music file. Desired pieces of music in the file can be added to the play list while checking the titles of pieces of music in the play list displayed in the window 130. Thus, the user can add desired pieces of music to the play list while checking the content of the play list. It is therefore possible to prevent a piece of music from being added when the same piece of music is included in the list.

As thus described, there is no need for opening a window to check the content of a folder, and the content of the folder can be checked using a window which is presently displayed.

8. Modifications (Modifications 1 to 8)

Modification 1

The embodiment of the present disclosure has been described above, and the embodiment may be modified in various ways without departing the spirit of the present disclosure. The above embodiment has been described with reference to first to sixth exemplary display operations, and the exemplary display operations may be used in various combinations. For example, the second dragging operation described with reference to FIG. 8 may be performed on the folder icon 63 in the exemplary display operation described with reference to FIGS. 6A, 6B, and 6C. The distance between the icons on the locus L1 in FIG. 7 and the distance between the icons on the locus 2 in the figure may be different from each other depending on the speed of the dragging operation for displaying each of the loci.

Modification 2

In the above-described embodiment, a dragging operation is performed by moving the mouse 13 with the mouse button 13A of the mouse 13 kept depressed. The use of the mouse 13 is not limited to such an example. A dragging operation may alternatively include, for example, the steps of selecting a folder by pressing the mouse button 13B and moving the mouse 13 with the mouse button 13B kept depressed. A dragging operation may alternatively be performed by moving the mouse 13 with a particular key of the keyboard 8 kept depressed.

Modification 3

Although a mouse is used as means for a dragging operation in the above-described embodiment, the present disclosure is not limited to the use of a mouse. For example, when the display section 11 is provided in the form of a touch panel, a folder icon can be deployed and displayed as described above by touching the icon on the display screen with a finger to select a folder and moving the finger on the screen with the icon kept in the selected state.

A dragging operation can be performed using means other than a mouse or touch panel. For example, a voice recognition technique may be used. A dragging operation may be performed by instructing the personal computer 1 using voice messages prompting it to select a folder and to move the folder along an arbitrary locus with the folder kept in the selected state.

Modification 4

In the above-described embodiment, icons are deployed and displayed in the order of counts of access to folders and files associated with the icons, but the present disclosure is not limited to such an embodiment. For example, such an order may be set according to the order of final dates of update, date created files, the alphabetical order of file names, or file types. The sizes of icons thus deployed and displayed may be made different from each other. For example, an icon which is first deployed and displayed may have a great size, and subsequent icons may be deployed and displayed in descending sizes.

Modification 5

When a plurality of loci is displayed on the display section 11 as shown in the view of the fifth exemplary display operation of FIG. 8, each locus may be displayed in a manner distinguishable from other loci. For example, the loci L1 and L2 shown in FIG. 8 may be displayed in different colors. The loci L1, L2 and L3 shown in FIGS. 9A and 9B may be displayed in different colors. Thus, it is possible to advise a user of the folder in which each object is stored clearly.

Modification 6

In the exemplary display operations of the above-described embodiment, an icon is identified as a folder or file for simplicity of description, and a file or folder may be identified by a file or folder name which is arbitrarily created by a user. For example a file or folder may be displayed with an artist name, a title of music, or a document title.

Modification 7

In the exemplary display operation shown in FIGS. 9A and 9B, the icons moved from the locus L2 onto the locus L3 may be folder icons. In this case, the file system is updated such that a plurality of objects stored in the moved folder will be stored in the folder 906.

Modification 8

While the above embodiment has been described using a file system having a hierarchical structure, the embodiment of the present disclosure may be applied to other types of file systems.

The present disclosure contains subject matter related to that disclosed in Japanese Priority Patent Application JP 2010-125613 filed in the Japan Patent Office on Jun. 1, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display method executed by an information processing apparatus having an operating section, a display section, and a control section configured to exercise display control over the display section, wherein a folder has a plurality of objects stored therein, the method comprising:
displaying a folder icon representing the folder on the display section; and
displaying a locus associated with a dragging operation performed on the folder icon using the operating section under control exercised by the control section and deploying and displaying object icons representing the plurality of objects on the locus,
wherein a distance between the deployed and displayed object icons varies depending on a speed of the dragging operation.

2. A display method according to claim 1, wherein the plurality of objects are files and/or folders having a hierarchical structure.

3. A display method according to claim 1, further comprising:
erasing the deployed and displayed object icons from the display section when a predetermined operation is performed on the folder icon after the object icons have been deployed and displayed.

4. A display method executed by an information processing apparatus having an operating section, a display section, and a control section configured to exercise display control over the display section, wherein a folder has a plurality of objects stored therein, the method comprising:
displaying a folder icon representing the folder on the display section;
displaying a locus associated with a dragging operation performed on the folder icon using the operating section under control exercised by the control section and deploying and displaying object icons representing the plurality of objects on the locus; and
notifying that object icons to be deployed and displayed remain in the folder icon when the dragging operation is terminated at a stage where some of the plurality of objects to be deployed and displayed have been deployed and displayed.

5. A display method according to claim 4, further comprising:
displaying a locus associated with another dragging operation performed using the operating section in a direction different from the direction of the dragging operation; and
deploying and displaying remaining objects on the locus.

6. A display method according to claim 4, further comprising
notifying that there are remaining object icons by changing the color of the folder icon.

7. A display method executed by an information processing apparatus having an operating section, a display section, and a control section configured to exercise display control over the display section, wherein a first folder has a plurality of objects including at least a second folder stored therein and the second folder has a plurality of objects stored therein, the method comprising:
displaying a first folder icon representing the first folder on the display section;
displaying a first locus associated with a first dragging operation performed on the first folder icon using the operating section under control exercised by the control section;
deploying and displaying object icons for objects stored in the first folder on the first locus and deploying and displaying a second folder icon representing at least the second folder;
displaying a second locus associated with a second dragging operation performed on the second folder icon using the operating section in a direction different from the direction of the first dragging operation; and
deploying and displaying object icons for the objects stored in the second folder on the second locus.

8. A display method according to claim 7, wherein the first folder further has a third folder stored therein and the third folder has a plurality of objects stored therein, the method comprising:
deploying and displaying a third folder icon representing the third older on the first locus further according to the first dragging operation;
displaying a third locus associated with a third dragging operation performed on the third folder icon in a direction different from the directions of the first and second dragging operations;
deploying and displaying object icons for the objects stored in the third folder on the third locus; and
displaying the object icons displayed on the second locus on the third locus when the object icons are dragged toward the third locus and storing the objects associated with the object icons in the third folder.

9. A display method according to claim 7, wherein the loci are displayed such that they can be distinguished from each other.

* * * * *